United States Patent Office.

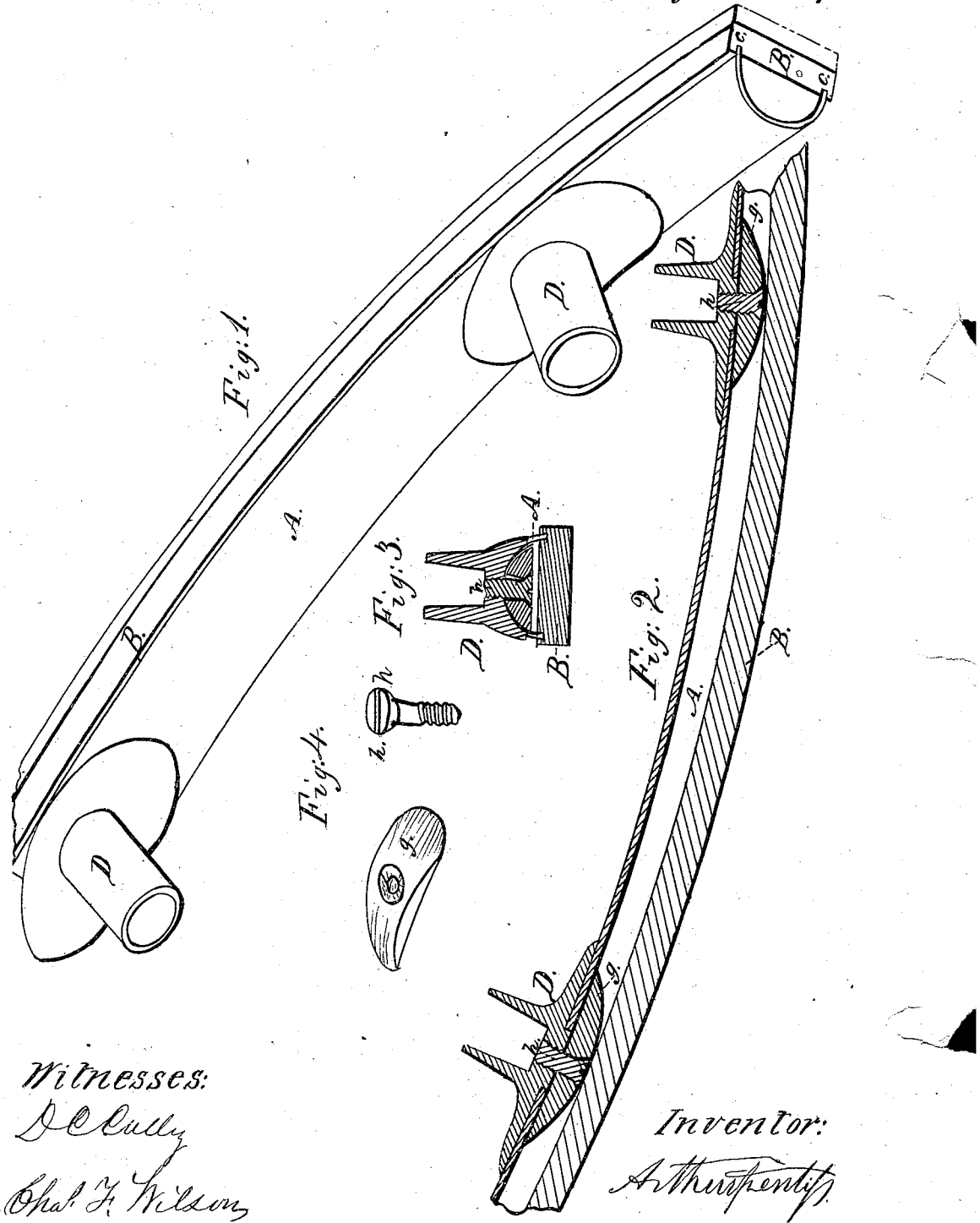

ARTHUR PRENTISS, OF PRENTISS VALE, PENNSYLVANIA.

Letters Patent No. 64,794, dated May 14, 1867.

IMPROVEMENT IN CARRIAGE-WHEELS.

The Schedule referred to in these Letters Patent and making part of the same.

TO ALL WHOM IT MAY CONCERN:

Be it known that I, ARTHUR PRENTISS, of Prentiss Vale, McKean county, Pennsylvania, have made new and useful Improvements in Carriage-Wheels; and I do hereby declare the following to be a full and exact description of the same, reference being had to the drawings that accompany and form a part of these specifications, in which—

Figure I is a view of a portion of a felloe-tire and spoke-socket and felloe-clasp.

Figure II, sectional view of the same.

Figure III, sectional view of socket, felloe-tire, block, and screw or bolt.

Figure IV, view of block and screw.

Letter A represents a wheel-felloe, made of metal swaged or rolled into the desired form. Letter B, a tire provided with grooves $c\ c$ to receive the edges of the felloe B, as seen in Fig. I. Letters D D', spoke-sockets, provided with the flanges E E' made to fit the felloe, as the drawings show. Letter $g$, small block of metal or wood to fill the concavity of the felloe at the place where the spokes come. Letter $h$, screw-bolt, running through the block $g$, and fitting with threads into the base of the spoke-socket, as seen in Fig. II.

The object of my invention is to provide a durable and graceful wheel, and one that may have an accidentally broken spoke replaced in an expeditious manner without taking off the rim of the wheel. This latter feature is provided for by the use of the spoke-sockets D. These sockets, in conjunction with the screw $h$ and block $g$, bind the felloe in place firmly, whether said felloe is made in one or several pieces. For very heavy wheels the tire B may be replaced by a band of wood or metal and then a steel tire put over the wheel, as represented in Fig. I, the red lines showing this outer tire.

What I claim as my invention, and desire to secure by Letters Patent, is—

The wheel, rim, or felloe, when swaged or otherwise formed into suitable shape of sheet metal, either in one or many pieces, in combination with the grooved tire B, either when this grooved tire B is made the principal tire or used in connection with the supplemental one, as shown in Fig. I.

ARTHUR PRENTISS.

Witnesses:
CHAS. F. WILSON,
D. C. CALLEY.